US008472713B2

(12) United States Patent
Manabe

(10) Patent No.: US 8,472,713 B2
(45) Date of Patent: Jun. 25, 2013

(54) IMAGE PROCESSOR, IMAGE PROCESSING METHOD, AND COMPUTER-READABLE MEDIUM

(75) Inventor: Yoshitsugu Manabe, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 209 days.

(21) Appl. No.: 13/187,233

(22) Filed: Jul. 20, 2011

(65) Prior Publication Data

US 2012/0020556 A1    Jan. 26, 2012

(30) Foreign Application Priority Data

Jul. 21, 2010 (JP) ................................ P2010-164148
Mar. 1, 2011 (JP) ................................ P2011-044532

(51) Int. Cl.
| G06K 9/00 | (2006.01) |
| G06K 9/36 | (2006.01) |
| G06K 9/40 | (2006.01) |
| G03F 3/08 | (2006.01) |
| G09G 1/14 | (2006.01) |
| G09G 3/28 | (2006.01) |
| G09G 3/30 | (2006.01) |
| G09G 5/00 | (2006.01) |
| G09G 5/10 | (2006.01) |

(52) U.S. Cl.
USPC ........... 382/167; 382/168; 382/169; 382/270; 382/274; 358/518; 345/20; 345/63; 345/77; 345/581; 345/690

(58) Field of Classification Search
None
See application file for complete search history.

(56) References Cited

U.S. PATENT DOCUMENTS

| 4,831,434 A | 5/1989 | Fuchsberger |
| 5,808,697 A * | 9/1998 | Fujimura et al. .............. 348/672 |
| 6,633,675 B1 * | 10/2003 | Abe .............................. 382/232 |
| 6,804,408 B1 * | 10/2004 | Gallagher et al. ............ 382/272 |

(Continued)

FOREIGN PATENT DOCUMENTS

| JP | 63-59292 A | 3/1988 |
| JP | 2003-331307 A | 11/2003 |

(Continued)

OTHER PUBLICATIONS

Korean Office Action dated Aug. 22, 2012 (and English translation thereof) in counterpart Korean Application No. 10-2011-0072350.

(Continued)

Primary Examiner — Randolph I Chu
(74) Attorney, Agent, or Firm — Holtz, Holtz, Goodman & Chick, P.C.

(57) ABSTRACT

There is provided an image processor for processing input image data having a luminance component and other components, which are defined in a prescribed color space. The image processor includes: a first emphasis processor configured to process first image data so as to emphasize the contrast of the first image data in accordance with a first emphasis amount, wherein the first image data correspond to the luminance component of the input image data; a second emphasis processor configured to process second image data so as to emphasize the chroma of the second image data in accordance with the first emphasis amount, wherein the second image data correspond to said other components of the input image data; and an image data generator configured to generate new image data by combining the contrast-emphasized first image data and the chroma-emphasized second image data.

5 Claims, 9 Drawing Sheets

U.S. PATENT DOCUMENTS

| | | | |
|---|---|---|---|
| 6,809,838 B1 * | 10/2004 | Gilman et al. | 358/1.9 |
| 7,480,421 B2 | 1/2009 | Henley | |
| 8,135,235 B2 * | 3/2012 | Kang et al. | 382/276 |
| 2002/0031277 A1 * | 3/2002 | Lubin et al. | 382/254 |
| 2004/0066980 A1 * | 4/2004 | Gindele et al. | 382/274 |
| 2005/0089240 A1 * | 4/2005 | Gallagher et al. | 382/274 |
| 2005/0104827 A1 * | 5/2005 | Baik | 345/87 |
| 2010/0329553 A1 * | 12/2010 | Shiokawa et al. | 382/167 |
| 2012/0008015 A1 * | 1/2012 | Manabe | 348/234 |

FOREIGN PATENT DOCUMENTS

| | | |
|---|---|---|
| JP | 2004-229259 A | 8/2004 |
| JP | 2006-345509 A | 12/2006 |
| JP | 2007-325145 A | 12/2007 |

OTHER PUBLICATIONS

Japanese Office Action dated Jun. 12, 2012 (and English translation thereof) in counterpart Japanese Application No. 2011-044532.

* cited by examiner

  
FIG.4A  FIG.4B  FIG.4C
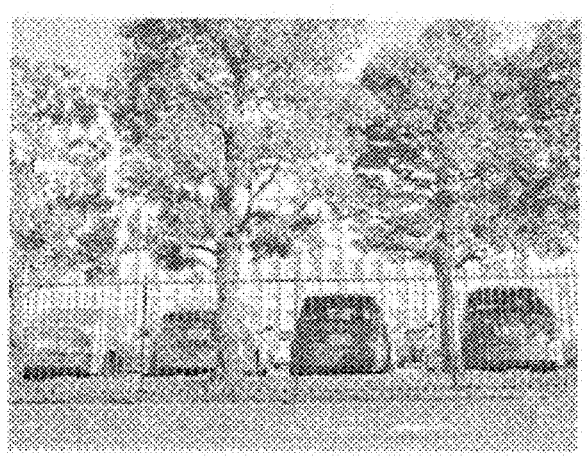
FIG.4D
FIG.4E

IMAGE PROCESSOR, IMAGE PROCESSING METHOD, AND COMPUTER-READABLE MEDIUM

BACKGROUND OF THE INVENTION

1. Field of the Invention

Embodiments described herein relate to a technique of performing image processing on a dynamic-range-increased image, for example.

2. Description of the Related Art

In recent years, various kinds of image processing have come to be performed on shot images to enhance their appearances when they are viewed. Among those kinds of image processing is processing disclosed in JP-A-2006-345509 which generates an image that are free of whiteout and blackout (such an image will be referred to as an HDR (high dynamic range) image) through combining of images taken under different exposure conditions in proper regions.

However, the above combining processing is for increasing reproduction performance relating to a shooting angle of view. Therefore, to produce an image in which color space parameters are adjusted excessively but reality is not lost, it is necessary to newly perform drawing processing from the start using a shot image as a base image.

SUMMARY OF THE INVENTION

Exemplary embodiments provide an image processor that generates an image in which color space parameters are adjusted using a shot image and reality is not lost.

According to one or more illustrative aspects of the present invention, there is provided an image processor for processing input image data having a luminance component and other components, which are defined in a prescribed color space. The image processor includes: a first emphasis processor configured to process first image data so as to emphasize the contrast of the first image data in accordance with a first emphasis amount, wherein the first image data correspond to the luminance component of the input image data; a second emphasis processor configured to process second image data so as to emphasize the chroma of the second image data in accordance with the first emphasis amount, wherein the second image data correspond to said other components of the input image data; and an image data generator configured to generate new image data by combining the contrast-emphasized first image data and the chroma-emphasized second image data.

According to one or more illustrative aspects of the present invention, there is provided an image processing method for processing input image data having a luminance component and other components, which are defined in a prescribed color space. The method includes: (a) processing first image data so as to emphasize the contrast of the first image data in accordance with a first emphasis amount, wherein the first image data correspond to the luminance component of the input image data; (b) processing second image data so as to emphasize the chroma of the second image data in accordance with the first emphasis amount, wherein the second image data correspond to said other components of the input image data; and (c) generating new image data by combining the contrast-emphasized first image data and the chroma-emphasized second image data.

According to one or more illustrative aspects of the present invention, there is provided a computer-readable medium storing a program for causing the computer to process input image data having a luminance component and other components, which are defined in a prescribed color space, in accordance with operations comprising: (a) processing first image data so as to emphasize the contrast of the first image data in accordance with a first emphasis amount, wherein the first image data correspond to the luminance component of the input image data; (b) processing second image data so as to emphasize the chroma of the second image data in accordance with the first emphasis amount, wherein the second image data correspond to said other components of the input image data; and (c) generating new image data by combining the contrast-emphasized first image data and the chroma-emphasized second image data.

BRIEF DESCRIPTION OF THE DRAWINGS

FIGS. 4A-4E show specific processing results of steps S1 and S2 which are executed by a combiner;

DETAILED DESCRIPTION OF THE PREFERRED EMBODIMENTS

Exemplary embodiments of the present invention will be now described with reference to the drawings.

Figure 1:
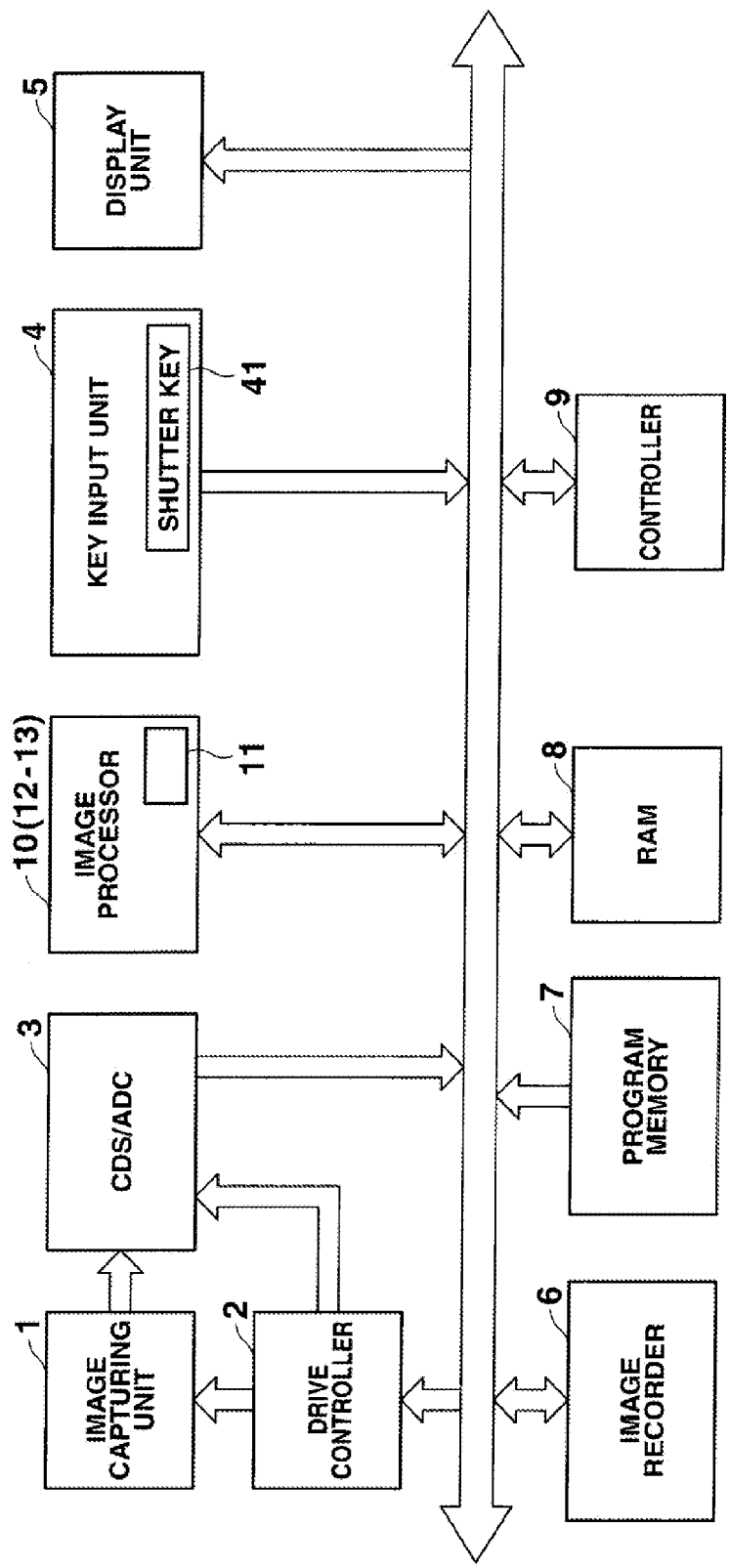
FIG. 1 is a block diagram of an imaging device according to an embodiment of the present invention.

FIG. 1 is a block diagram of an imaging device. The imaging device includes an image processor according to the embodiment of the invention. This imaging device is equipped with an image capturing unit 1, a drive controller 2, a CDS/ADC 3, a key input unit 4, a display unit 5, an image recorder 6, a program memory 7, a RAM 8, a controller 9, and an image processor 10. The respective units are connected to each other by a bus line.

The key input unit 4 includes a shutter key 41 for detecting a recording instruction of a photographer. The image processor 10 includes a combiner 11, and has functions of an image generator 12 and a noise reduction unit 13 (both described later).

The image capturing unit 1 incorporates an image sensor such as a CMOS sensor, RGB color filters placed on the image sensor, and a driver which holds a light intensity distribution in the form of a distribution of accumulated charges for a prescribed time and outputting an analog image signal representing it to the CDS/ADC 3 under the control of the drive controller 2.

The image capturing unit 1 acquires plural image data (color image data) including underexposure image data, correct exposure image data, and overexposure image data while changing an exposure condition (shutter speed or aperture) by detecting a shooting instruction of a photographer via the shutter key 41, the controller 9, and the drive controller 2.

The CDS/ADC 3 is a circuit which receives analog image signals corresponding to an optical image of a subject from the image capturing unit 1. The CDS/ADC 3 includes a CDS for holding received image signals, gain control amplifiers (AGC) for amplifying the image signals, and A/D converters (ADC) for converting amplified image signals into digital image signals.

A control relating to adjustment of the gain control amplifier is performed according to an instruction from the drive controller 2. Therefore, even when plural images are acquired under the same exposure condition, images corresponding to different conditions can be generated by sequentially changing the characteristics of the RGB gain control amplifiers or the image hue.

The key input unit 4 is equipped with, in addition to the above-mentioned shutter key 41, various keys for detecting an instruction about switching to a shooting mode for acquisition or recording of an image relating to the invention, an instruction about display switching, and other instructions. The display unit 5 is configured to display an image that has been subjected to combining processing.

The image recorder 6 stores image data (an image file) produced by combining processing according to the invention and subsequent JPEG coding. The program memory 7 is stored with programs to be run by the controller 9 and the image processor 10. Programs are read by the controller 9 when necessary. The RAM 8 has a function of temporarily holding data generated by each piece of processing and being processed. The controller 9 controls operations of the entire imaging device.

The image processor 10 is equipped with the combiner 11 which performs coding/decoding processing on image data and also performs the combining processing according to the invention.

Next, functions relating to image alteration processing will be described with reference to a functional block diagram of FIG. 2. The image alteration processing will be described below in detail is processing that processing subject images are subjected to pixel-by-pixel addition combining and a resulting image is subjected to contrast or chroma (saturation) emphasis.

In the combining processing, each of plural image data acquired through the image capturing unit 1 and the CDS/ADC 3 by consecutive shooting while an exposure condition (shutter speed, aperture, or gain control value) is changed is separated into signals representing three components defined in the YUV color space, that is, a luminance signal representing a Y component and a blue color difference signal and a red color difference signal representing U and V components. The plural luminance signals are subjected to pixel-by-pixel addition combining, and the set of plural blue color difference signals and the set of plural red color difference signals are each subjected to pixel-by-pixel addition combining.

Among a luminance signal (Y) and color difference signals (U and V) of HDR combined image data generated by the above combining processing, the luminance signal is subjected to contrast emphasis processing and each color difference signal is subjected to chroma (saturation) emphasis processing.

In particular, in the above processing, the entire image is not subjected contrast or chroma emphasis uniformly. Instead, contrast or chroma emphasis is performed on a pixel-by-pixel basis using emphasis amounts that are set adaptively for the respective pixels.

Figure 2:
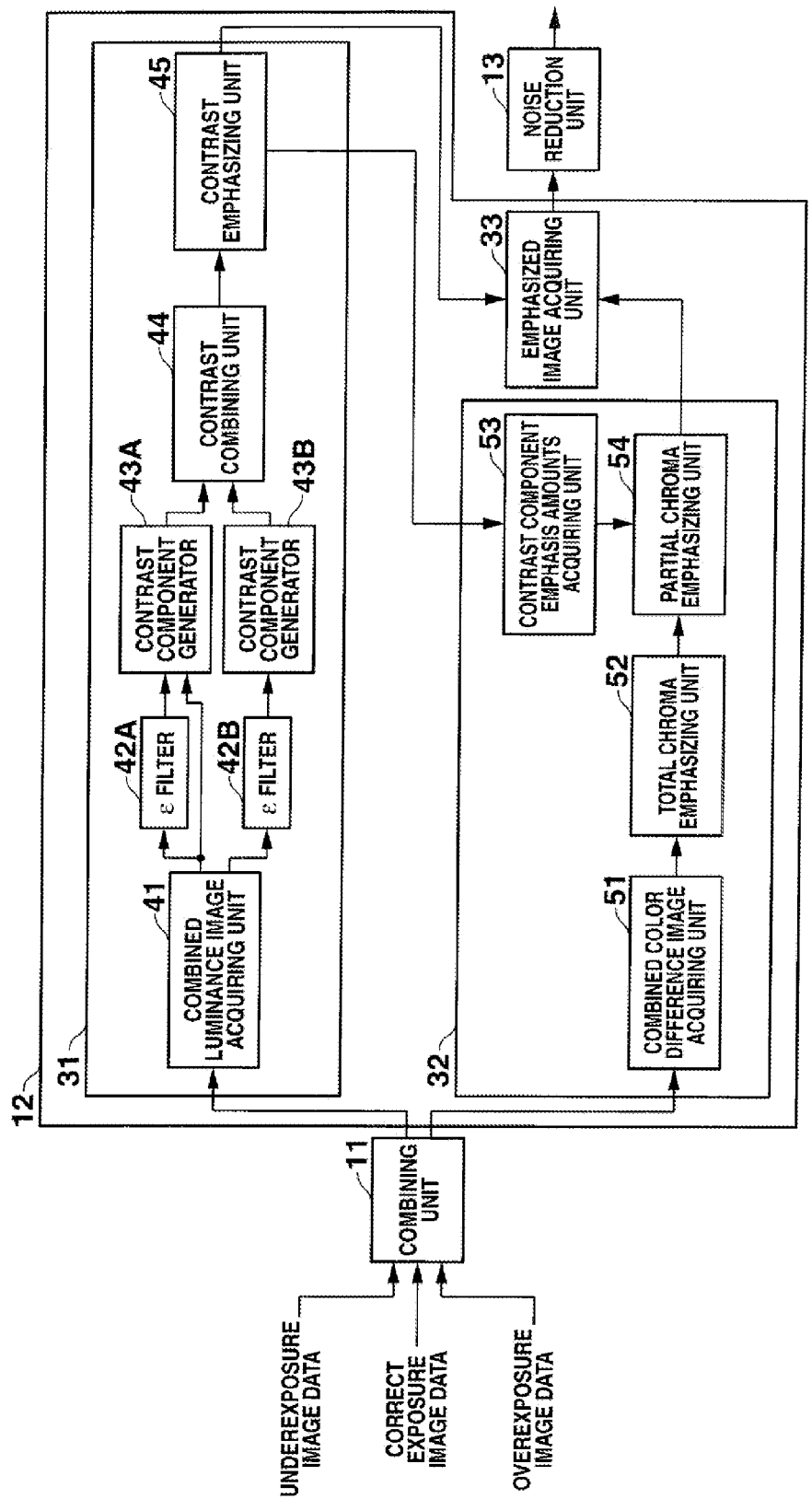
FIG. 2 is a functional block diagram showing functions for performing image alteration processing according to the invention which is performed by an image processor.

As shown in FIG. 2, the image processor (image processor 10) is equipped with the combiner 11, the image generator 12, and the noise reduction unit 13.

In the embodiment, as shown in FIG. 2, correct exposure image data of a correct exposure value (hereinafter referred to as "correct exposure image data"), image data of an exposure value that is larger than the correct exposure value (hereinafter referred to as "overexposure image data"), and image data of an exposure value that is smaller than the correct exposure value (hereinafter referred to as "underexposure image data") are input to the combiner 11 as plural image data acquired under different exposure conditions.

The term "correct exposure value" does not necessarily mean an exposure value that is suitable for shooting but means an exposure value that is an intermediate value between two exposure values that were used in taking an overexposure image and an underexposure image.

The combiner 11 generates HDR combined image data by performing pixel-by-pixel addition combining on the correct exposure image data, the overexposure image data, and the underexposure image data.

Although the kind of the combining processing performed by the combiner 11 is not limited to particular processing, it is advantageous to employ combining processing that is stronger in the dynamic range increasing effect than conventional combining processing for generating HDR combined image data.

And method for making the dynamic range increasing effect stronger is not limited to a particular method. Exemplary methods are increasing the difference between an underexposure value and an overexposure value (a range variation) at the time of shooting, increasing the number of images to be combined, and changing a gain parameter of a hue or the like.

In the embodiment, the combiner 11 executes the following series of steps as the combining processing.

In the embodiment, although not shown in any drawing, luminance image data having the correct exposure value and two color difference image data having the correct exposure value that have been separated from the correct exposure image data are input to the combiner 11 independently. Likewise, luminance image data having the overexposure value and two color difference image data having the overexposure value that have been separated from the overexposure image data are input to the combiner 11 independently. And luminance image data having the underexposure value and two color difference image data having the underexposure value that have been separated from the underexposure image data are input to the combiner 11 independently.

The combiner 11 generates combined image data by performing pixel-by-pixel addition combining on the luminance image data having the correct exposure value, the luminance image data having the overexposure value, and the luminance image data having the underexposure value. The combiner 11 also generates two combined image data by performing pixel-by-pixel addition combining on the two color difference image data having the correct exposure value, the two color difference image data having the overexposure value, and the two color difference image data having the underexposure value, respectively.

In the embodiment, in the luminance component combining processing, the luminance image data having the correct exposure value, the luminance image data having the overexposure value, and the luminance image data having the underexposure value are subjected to pixel-by-pixel addition combining according to a prescribed combining ratio.

The term "combining ratio" means a mixing ratio of individual image data when two or more image data are subjected to pixel-by-pixel addition combining. For example, if the combining ratio of the luminance image data having the correct exposure value, the luminance image data having the overexposure value, and the luminance image data having the underexposure value is 70:30:0, combined luminance image data is obtained by mixing the luminance image data having the correct exposure value, the luminance image data having the overexposure value, and the luminance image data having the underexposure value at the ratio 70:30:0.

On the other hand, in the color difference component combining processing, the blue or red color difference image data having the correct exposure value, the blue or red color difference image data having the overexposure value, and the blue or red color difference image data having the underexposure value are subjected to pixel-by-pixel addition combining according to a prescribed combining ratio which is the same as the prescribed combining ratio used for the luminance component combining processing.

As a result, the combiner 11 outputs a set of combined luminance image data generated by the luminance component combining processing and two combined color difference component image data generated by the color difference component combining processing.

The image generator 12 performs contrast emphasis processing on the combined luminance image data that is output from the combiner 11 and performs chroma emphasis processing on each of the two combined color difference component image data that are output from the combiner 11. The image generator 12 is equipped with a contrast emphasis processor 31 which performs the contrast emphasis processing and a chroma emphasis processor 32 which performs the chroma emphasis processing.

The contrast emphasis processor 31 emphasizes contrast locally by performing unsharpening mask processing in two frequency bands (e.g., a low-frequency band and a medium-frequency band) on the combined luminance image data (the combined luminance image data is smoothed). No particular limitations are imposed on the filter that is used for such smoothing. Although an ordinary LPF (lowpass filter) may be employed, it is advantageous to use a nonlinear filter such as an edge-maintaining s filter or a bilateral filter.

The contrast emphasis processor 31 is equipped with a combined luminance image acquiring unit 41, ε filters 42A and 42B, contrast component generators 43A and 43B, a contrast component combiner 44, and a contrast emphasizing unit 45.

The functions of the individual components of the contrast emphasis processor 31 will be described as appropriate in describing a contrast emphasis process later with reference to a flowchart of FIG. 3.

The chroma emphasis processor 32 performs processing of chroma on each combined color difference image data using a prescribed gain (hereinafter referred to as a UV gain) as an emphasis amount.

The chroma emphasis processing is generally divided into two kinds of processing, that is, total emphasis processing and partial emphasis processing. The total emphasis processing is processing of emphasizing chroma so that the entire image looks showy. The partial emphasis processing is processing of emphasizing chroma using emphasis amounts that are linked with contrast component emphasis amounts that have been used in the contrast emphasis processing.

In the following, the emphasis amounts for the contrast emphasis processing will be referred to as contrast component emphasis amounts and the emphasis amounts for the chroma emphasis processing will be referred to as chroma component emphasis amounts. Furthermore, the chroma component emphasis amounts are generally divided into an emphasis amount used for the total emphasis processing and emphasis amounts used for the partial emphasis processing. The former will be referred to as a total chroma component emphasis amount and the latter will be referred to as partial chroma component emphasis amounts.

A series of steps executed by the chroma emphasis processor 32 will be referred to as a chroma emphasis process. The chroma emphasis processor 32, which executes the chroma emphasis process, includes a combined color difference image acquiring unit 51, a total chroma emphasizing unit 52, a contrast component emphasis amounts acquiring unit 53, and a partial chroma emphasizing unit 54.

The image generator 12 is also equipped with an emphasized image acquiring unit 33. The emphasized image acquiring unit 33 acquires emphasized image data which is a combination of combined luminance image data that has been generated by the contrast emphasis processor 31 through the contrast emphasis processing and two combined color difference image data that have been generated by the chroma emphasis processor 32 through the chroma emphasis processing.

The emphasized image data acquired by the emphasized image acquiring unit 33 is provided to the noise reduction unit 13. The noise reduction unit 13 performs noise reduction processing on the emphasized image data.

Next, an image alteration process which is executed by the image processor of FIG. 2 having the above functional configuration will be described with reference to a flowchart of FIG. 3. FIG. 3 is a flowchart of an example image alteration process.

At step S1, the combiner 11 acquires plural image data which have been produced by consecutive shooting or the like at different exposure values. At step S2, the combiner 11 generates HDR combined image data by performing pixel-by-pixel addition combining on the plural image data having the different exposure values.

More specifically, in the embodiment, HDR combined image data is generated in such a manner that correct exposure image data, overexposure image data, and underexposure image data are acquired at step S1 and subjected to pixel-by-pixel addition combining at step S2.

FIGS. 4A-4E show specific processing results of steps S1 and S2 which are executed by the combiner 11. FIG. 4A shows example underexposure luminance image data acquired at step S1. FIG. 4B shows example correct exposure luminance image data acquired at step S1. FIG. 4C shows example overexposure luminance image data acquired at step S1.

FIG. 4D shows example combined image data generated at step S2 through pixel-by-pixel addition combining. FIG. 4E shows example combined image data generated at step 52 in which the effect of combining is stronger than in the example combined image data of FIG. 4D. Increasing the effect of combining makes more remarkable an advantage that an HDR combined image is obtained in which color space parameters are adjusted excessively but reality is not lost.

Figure 3:
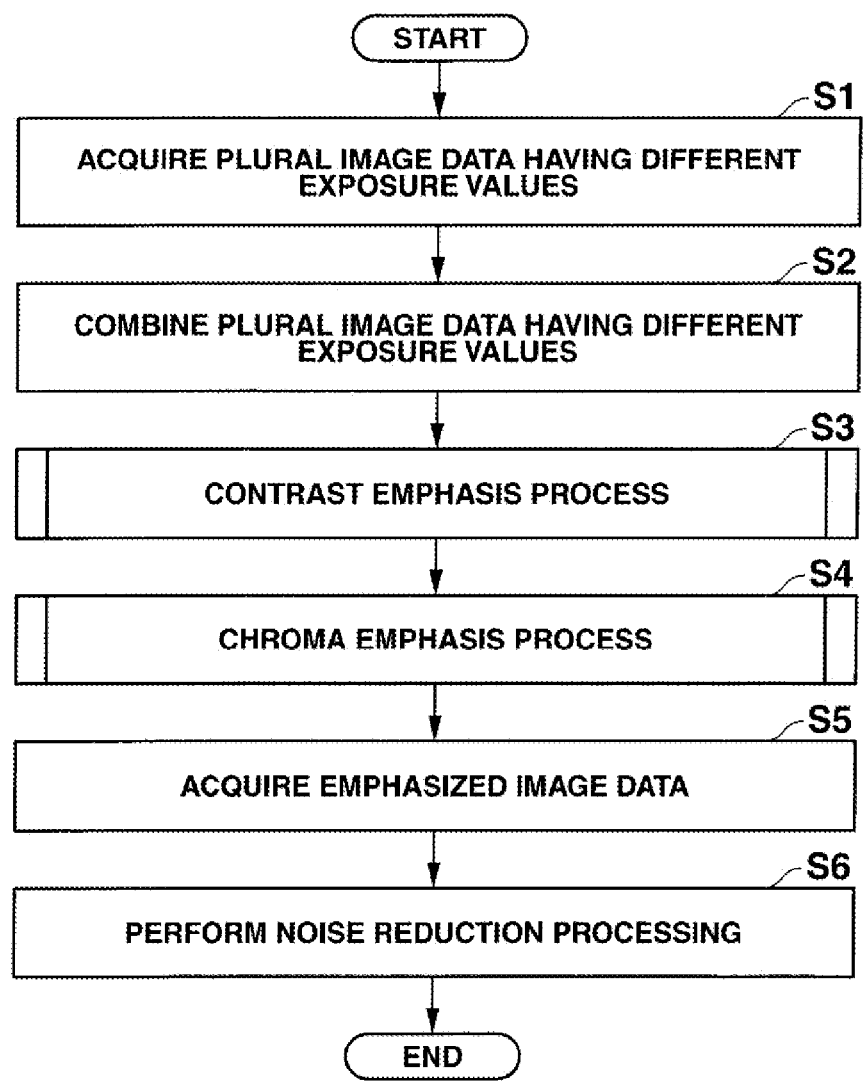
FIG. 3 is a flowchart of an example image alteration process which is executed by the image processor of FIG. 2.

Therefore, in the embodiment, between the combined image data of FIGS. 4D and 4E, the combined image data of FIG. 4E is provided to the image generator 12 as a processing subject and subjected there to steps S3-S5 shown in FIG. 3.

At step S3, the contrast emphasis processor 31 of the image generator 12 performs contrast emphasis processing on combined luminance image data of the combined image data which was generated at step S2.

At step S4, the chroma emphasis processor 32 of the image generator 12 performs chroma emphasis processing on each of two combined color difference image data of the combined image data which was generated at step S2.

The details of step S3 (contrast emphasis process) will be described later with reference to a flowchart of FIG. 5, and the details of step S4 (chroma emphasis process) will be described later with reference to a flowchart of FIG. 6.

At step S5, the emphasized image acquiring unit 33 acquires emphasized image data which is a combination of combined luminance image data that was generated at step S3 through the contrast emphasis processing and two combined color difference image data that were generated at step S4 through the chroma emphasis processing.

At step S6, the noise reduction unit 13 performs noise reduction processing on the emphasized image data acquired at step S5. Noise-reduced emphasized image data is output from the noise reduction unit 13, whereupon the image alteration process is finished.

Next, the contrast emphasis process and the chroma emphasis process which are steps S3 and S4 of the above-described image alteration process, respectively, will be described in detail individually in this order.

First, the contrast emphasis process which is executed at step S3 will be described in detail with reference to a flowchart of FIG. 5. FIG. 5 is a flowchart of an example contrast emphasis process.

At step S21, the combined luminance image acquiring unit 41 of the contrast emphasis processor 31 shown in FIG. 2 acquires combined luminance image data of combined image data that is output from the combiner 11.

At step S22, the contrast emphasis processor 31 sets, as a pixel of interest (subject of processing), a pixel that is located at a prescribed position (coordinates) among the pixels constituting the combined luminance image data. When data (a pixel value) of the pixel of interest of the combined luminance image data has been provided to each of the ε filters 42A and 42B and the contrast component generators 43A and 43B, the process moves to step S23.

At step S23, the ε filters 42A and 42B and the contrast component generators 43A and 43B generate two contrast components of the pixel of interest from the data (pixel value) of the pixel of interest of the combined luminance image data using ε filters of two frequency bands (a medium-frequency band and a low-frequency band).

In the embodiment, a component for one of two kinds of contrast for which components are to be generated is generated using the ε filter for medium-frequency band emphasis which has a small filter size. Therefore, this kind of contrast will be referred to as medium-frequency band contrast. A component for the other kind of contrast is generated using the ε filter for low-frequency band emphasis which has a large filter size. This kind of contrast will be referred to as low-frequency band contrast.

In the embodiment, a medium-frequency band contrast component is generated by the ε filter 42A and the contrast component generator 43A by executing the following series of steps.

The ε filter 42A applies the ε filter for medium-frequency band emphasis to the data of the pixel of interest of the combined luminance image data and provides resulting data (hereinafter referred to as filtered data) to the contrast component generator 43A.

The contrast component generator 43A generates a medium-frequency band contrast component of the pixel of interest by taking the difference between the data of the pixel of interest of the combined luminance image data and the filtered data of the pixel of interest.

More specifically, a medium-frequency band contrast component of the pixel of interest is generated according to the following Equation (1):

$$Y\_contrast\_1 = Y\_HDR - Y\_\epsilon\_1 \qquad (1)$$

where Y_contrast_1 is the medium-frequency band contrast component of the pixel of interest, Y_HDR is the data (pixel value) of the pixel of interest of the HDR combined luminance image, and Y_ε_1 is the filtered data of the pixel of interest generated using the medium-frequency band ε filter.

On the other hand, in the embodiment, a low-frequency band contrast component is generated by the ε filter 42B and the contrast component generator 43B by executing the following series of steps.

The ε filter 42B applies the ε filter for low-frequency band emphasis to the data of the pixel of interest of the combined luminance image data and supplies resulting data (hereinafter referred to as filtered data) to the contrast component generator 43B.

The contrast component generator 43B generates a low-frequency band contrast component of the pixel of interest by taking the difference between the data of the pixel of interest of the combined luminance image data and the filtered data of the pixel of interest.

More specifically, a low-frequency band contrast component of the pixel of interest is generated according to the following Equation (2):

$$Y\_contrast\_2 = Y\_HDR - Y\_\epsilon\_2 \qquad (2)$$

where Y_contrast_2 is the low-frequency band contrast component of the pixel of interest, Y_HDR is the data (pixel value) of the pixel of interest of the HDR combined luminance image, and Y_ε_2 is the filtered data of the pixel of interest generated using the low-frequency band ε filter.

The thus-generated two contrast components of the pixel of interest, that is, the medium-frequency band contrast component of the pixel of interest generated by the contrast component generator 43A and the low-frequency band contrast component of the pixel of interest generated by the contrast component generator 43B, are supplied to the contrast combiner 44. Then, the process moves to step S24 shown in FIG. 5.

At step S24, the contrast combiner 44 generates a combined contrast component of the pixel of interest by adding together the two contrast components of the pixel of interest, that is, the medium-frequency band contrast component of the pixel of interest and the low-frequency band contrast component of the pixel of interest, according to the following Equation (3):

$$Y\_contrast = Y\_contrast\_1 + Y\_contrast\_2 \qquad (3)$$

where Y_contrast is the combined contrast component of the pixel of interest, Y_contrast_1 is the medium-frequency band contrast component of the pixel of interest calculated according to Equation (1) and Y_contrast_2 is the low-frequency band contrast component of the pixel of interest calculated according to Equation (2).

The combined contrast component of the pixel of interest generated by the contrast combiner 44 is provided to the contrast emphasizing unit 45. Then, the process moves to step S25 shown in FIG. 5.

At step S25, the contrast emphasizing unit 45 adjusts and limits the combined contrast component of the pixel of interest.

More specifically, in the embodiment, the combined contrast component of the pixel of interest is adjusted according to the following Equation (4):

$$Y\_contrast = Y\_contrast \times (Y\_gain\_lev/100) \times (Y\_adj\_lev/100) \quad (4)$$

In Equation (4), Y_contrast on the left side is the adjusted combined contrast component of the pixel of interest and Y_contrast on the right side is the contrast component of the pixel of interest before the adjustment. The parameter Y_gain_lev is the level (%) of a gain that is set uniformly for the entire combined luminance image data (hereinafter referred to as a luminance component gain). The parameter Y_adj_lev is the level (%) of an adjustment amount (hereinafter referred to as a luminance component adjustment amount) that is set for the data of the individual pixel of interest of the combined luminance image data.

Luminance component adjustment amounts Y_adj_lev are set individually for the respective pixels of the combined luminance image according to respective pixel data Y_HDR. Therefore, the luminance component adjustment amount Y_adj_lev of the pixel of interest is varied adaptively according to the pixel data Y_HDR, whereby the combined contrast component Y_contrast is adjusted adaptively on a pixel-by-pixel basis. This makes it possible to reduce adverse effects, such as blackout, whiteout, and color saturation, of pixel value saturation due to contrast emphasis.

In the embodiment, the combined contrast component of the pixel of interest is limited according to the following Equation (5) if it is larger than 0 (Y_contrast>0) and according to the following Equation (6) if not:

$$Y\_contrast = f\min(Y\_contrast, Y\_contrast\_max\_lev) \quad (5)$$

$$Y\_contrast = f\max(Y\_contrast, |Y\_contrast\_max\_lev|) \quad (6)$$

In Equations (5) and (6), Y_contrast on the left side is the limited combined contrast component of the pixel of interest and Y_contrast on the right side is the combined contrast component of the pixel of interest before the limitation. The parameter Y_contrast_max_lev is a preset upper limit level of the combined contrast component. In Equation (5), $f\min(\alpha, \beta)$ is a function which outputs the minimum value of $\alpha$ and $\beta$. In Equation (6), $f\max(\alpha, \beta)$ is a function which outputs the maximum value of $\alpha$ and $\beta$.

Figure 5:
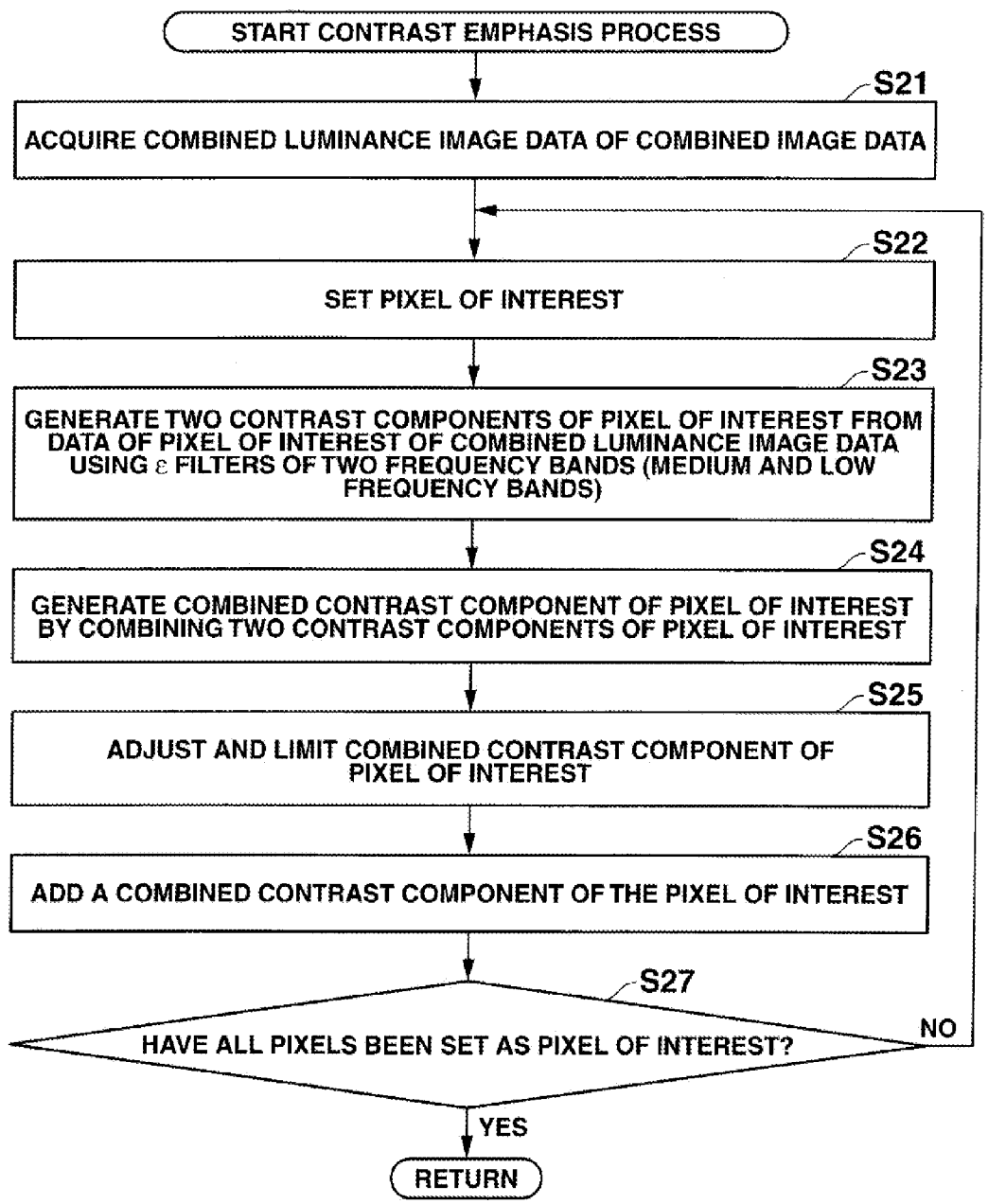
FIG. 5 is a flowchart of an example contrast emphasis process which is executed by an image generator of the image processor of FIG. 2.

Then, at step S26 shown in FIG. 5, the contrast emphasizing unit 45 adds a combined contrast component of the pixel of interest as adjusted and limited at step S25 to the data of the pixel of interest of the combined luminance image data.

As a result, the data of the pixel of interest of the combined luminance image data is contrast-emphasized by the combined contrast component of the pixel of interest as adjusted and limited at step S25.

More specifically, the data of the pixel of interest of the combined luminance image data is contrast-emphasized according to the following Equation (7):

$$Y\_result = Y\_HDR + Y\_contrast$$

In Equation (7), Y_result is the data (pixel value) of the pixel of interest that has been subjected to the contrast emphasis process. The parameter Y_HDR is the data (pixel value) of the pixel of interest before being subjected to the contrast emphasis process. The parameter Y_contrast is the combined contrast component of the pixel of interest that has been adjusted according to Equation (4) and limited according to Equation (5) or (6), and is also a contrast component emphasis amount.

At step S27, the contrast emphasis processor 31 judges whether or not all the pixels constituting the combined luminance image have been set as a pixel of interest. If there remains a pixel(s) that has not been set as a pixel of interest yet (S27: no), the process returns to step S22.

That is, the loop of steps S22-S27 is executed and the data of the pixel of interest is contrast-emphasized (updated) every time one of the pixels constituting the combined luminance image is set as a subject of attention. As described above, the degree of contrast emphasis is varied adaptively according to the value of the data Y_HDR of the pixel of interest that is not subjected to the contrast emphasis.

If the last pixel is set as a subject of attention at step S22 and then steps S23-S26 are executed, the judgment result of step S27 turns "yes" because all the pixels constituting the combined luminance image have been set as a pixel of interest (and their pixel values have been updated to values Y_result (see Equation (7)). Then, the contrast emphasis process is finished.

That is, the contrast emphasis process which is step S3 of the image alteration process of FIG. 3 is thus completed. The chroma emphasis process which is step S4 of the image alteration process of FIG. 3 is then executed.

The chroma emphasis process (step S4) will be described below in detail with reference to a flowchart of FIG. 6. FIG. 6 is an example chroma emphasis process.

At step S41, the combined color difference image acquiring unit 51 of the chroma emphasis processor 32 shown in FIG. 2 acquires two combined color difference image data of the combined image data that is output from the combiner 11.

At step S42, the chroma emphasis processor 32 sets, as a pixel of interest, a pixel that is located at a prescribed position (coordinates) among the pixels constituting each combined color difference image data Although in the embodiment the chroma emphasis processor 32 operates asynchronously with the contrast emphasis processor 31, the following description will be made with an assumption that the pixel of interest of each combined color difference image data corresponds to (i.e., is located at the same position (coordinates) as) that of the combined luminance image data.

At step S43, the total chroma emphasizing unit 52 performs total chroma emphasis processing on the data of the pixel of interest of each combined color difference image data using a total chroma component emphasis amount.

More specifically, in the embodiment, total chroma emphasis processing is performed on the data of the pixel of interest of each combined color difference image data according to the following Equations (8) and (9).

$$U\_HDR' = U\_HDR \times UV\_gain\_lev\_al/100 \quad (8)$$

$$V\_HDR' = V\_HDR \times UV\_gain\_lev\_al/100 \quad (9)$$

In Equation (8), U_HDR' is the color difference value (U value) of the pixel of interest, as subjected to the total chroma emphasis processing, of the combined color difference image data. The parameter U_HDR is the color difference value (U value) of the pixel of interest, before being subjected to the total chroma emphasis processing, of the combined color difference image data.

In Equation (9), V_HDR' is the color difference value (V value) of the pixel of interest, as subjected to the total chroma emphasis processing, of the combined color difference image data. The parameter V_HDR is the color difference value (V value) of the pixel of interest, before being subjected to the total chroma emphasis processing, of the combined color difference image data.

In Equations (8) and (9), UV_gain_lev_al is a total gain (%) as the total chroma component emphasis amount that is set uniformly for each entire combined color difference image data.

At step S44, the contrast component emphasis amount acquiring unit 53 acquires a contrast component emphasis amount that has been used for the data of the pixel of interest of the combined luminance image data in the contrast emphasis process.

More specifically, a contrast component emphasis amount is acquired according to the following Equation (10).

$$Y\_emphasis\_lev = |Y\_contrast| \qquad (10)$$

In Equation (10), Y_emphasis_lev is the acquired contrast component emphasis amount. The parameter Y_contrast is the combined contrast component of the pixel of interest that has been adjusted according to Equation (4) and limited according to Equation (5) or (6) and that has been added to the data of the pixel of interest (pixel value Y_HDR) that is not subjected to the contrast emphasis process (see Equation (7)).

At step S45, the partial chroma emphasizing unit 54 performs partial chroma emphasis processing on the data of the pixel of interest, as subjected to the total chroma emphasis processing at step S43, of each combined color difference image data using a partial chroma component emphasis amount which linked with the contrast component emphasis amount acquired at step S44.

More specifically, in the embodiment, partial chroma emphasis processing is performed on the U value of the pixel of interest, as subjected to the total chroma emphasis processing, of the combined color difference image data according to the following Equation (11):

$$U\_result = U\_HDR' + U\_HDR \times \qquad (11)$$
$$(UV\_gain\_lev\_part \times Y\_emphasis\_lev / Y\_contrast\_max\_lev)/$$
$$100 \times UV\_adj\_lev/100$$

In Equation (11), U_result is the U value of the pixel of interest, subjected to the total chroma emphasis processing and the partial chroma emphasis processing, of the combined color difference image data. The parameter U_HDR' is the U value of the pixel of interest, as subjected to the total chroma emphasis processing according to Equation (8), of the combined color difference image data. The parameter UV_gain_lev_part is a partial gain (%). The parameter Y_emphasis_lev is the contrast component emphasis amount acquired according to Equation (10). The parameter Y_contrast_max_ lev is an upper limit level that is preset as a combined contrast component.

The parameter (UV_gain_lev_part×Y_emphasis_lev/Y_contrast_max_lev) is a partial chroma emphasis amount (%) which is linked with the contrast component emphasis amount. The parameter UV_adj_lev is the level (%) of an adjustment amount (hereinafter referred to as a color difference adjustment amount) that is set for the data of the individual pixel of interest of the combined color difference image data.

Data UV_HDR is the larger one of the absolute values of the U value U_HDR and the V value V_HDR of the pixel of interest of the combined color difference image data (see the following Equation (12)):

$$UV\_HDR = fmax(|U\_HDR|, |V\_HDR|) \qquad (12)$$

where fmax($\alpha$, $\beta$) is a function which outputs the maximum value of $\alpha$ and $\beta$.

Color difference adjustment amount UV_adj_lev are set individually for the respective pixels of the combined color difference image according to respective data UV_HDR. Therefore, the color difference adjustment amount UV_adj_ lev of the pixel of interest is varied adaptively according to the data UV_HDR.

As a result, the degree of partial chroma emphasis on the U value U_HDR of the pixel of interest is adjusted adaptively on a pixel-by-pixel basis. This makes it possible to reduce adverse effects, such as blackout, whiteout, and color saturation, of pixel value saturation due to chroma emphasis.

In the embodiment, partial chroma emphasis processing is performed on the V value of the pixel of interest, as subjected to the total chroma emphasis processing, of the combined color difference image data according to the following Equation (13):

$$V\_result = V\_HDR' + V\_HDR \times \qquad (13)$$
$$(UV\_gain\_lev\_part \times Y\_emphasis\_lev / Y\_contrast\_max\_lev)/$$
$$100 \times UV\_adj\_lev/100$$

In Equation (13), V_result is the V value of the pixel of interest, subjected to the total chroma emphasis processing and the partial chroma emphasis processing, of the combined color difference image data. The parameter V_HDR' is the V value of the pixel of interest, as subjected to the total chroma emphasis processing according to Equation (9), of the combined color difference image data.

Like Equation (11), Equation (13) includes (UV_gain_ lev_ part×Y_emphasis_lev/Y_contrast_max_lev) as the partial chroma emphasis amount (%) which is linked with the contrast component emphasis amount, as well as the color difference adjustment amount UV_adj_lev.

Figure 6:
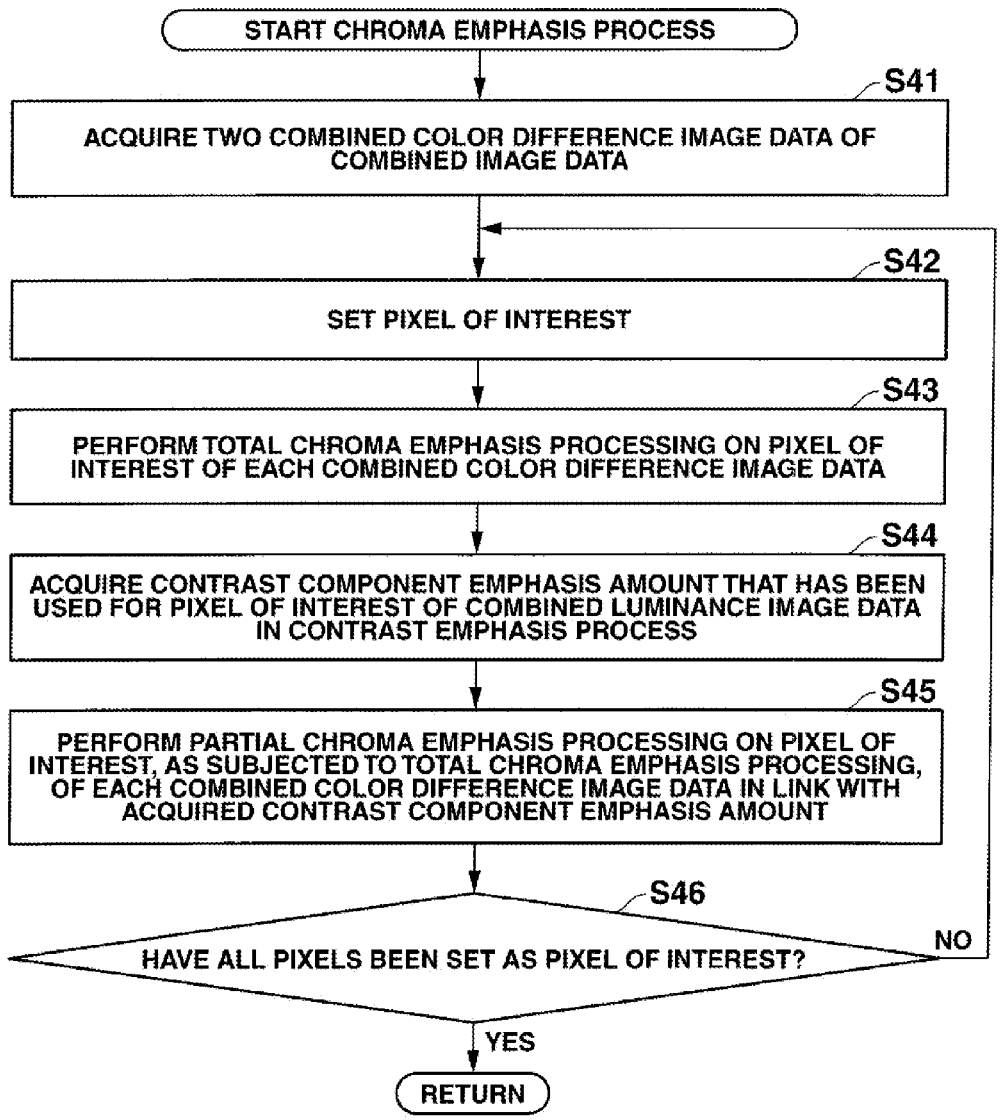
FIG. 6 is a flowchart of an example chroma emphasis process which is executed by the image generator of the image processor of FIG. 2.

At step S46 shown in FIG. 6, the chroma emphasis processor 32 judges whether or not all the pixels constituting each combined color difference image have been set as a pixel of interest. If there remains a pixel(s) that has not been set as a pixel of interest yet (S46: no), the process returns to step S42.

That is, the loop of steps S42-S46 is executed and the data of the pixel of interest is chroma-emphasized (updated) every time one of the pixels constituting each combined color difference image is set as a subject of attention. As described above, the degree of chroma emphasis is varied in link with the degree of contrast emphasis and adaptively according to the values of the data U_HDR and V_HDR of the pixel of interest that is not subjected to the chroma emphasis.

If the last pixel is set as a subject of attention at step S42 and then steps S43-S45 are executed, the judgment result of step S46 turns "yes" because all the pixels constituting each combined luminance image have been set as a pixel of interest (and their pixel values have been updated to values U_result (see Equation (11) or values V_result (see Equation (13)). Then, the chroma emphasis process is finished.

The chroma emphasis process which is step S4 of the image alteration process of FIG. 3 is thus completed, and the process of FIG. 3 moves to step S5. At step S5, a combination of the combined luminance image data that was contrast-emphasized at step S3 and the two combined color difference image data that were chroma-emphasized at step S4 is acquired by the emphasized image acquiring unit 33 as emphasized image data.

As described above, where combined image data is separated into combined luminance image data and two combined color difference image data, the contrast emphasis processor 31 shown in FIG. 2 emphasizes the contrast of the combined luminance image data using prescribed contrast component emphasis amounts.

On the other hand, the chroma emphasis processor 32 shown in FIG. 2 emphasizes the chroma of each combined color difference image data using chroma component emphasis amounts which vary in link with the respective contrast component emphasis amounts.

This makes it possible to provide an advantage that an HDR combined image is obtained in which color space parameters are adjusted excessively but reality is not lost.

In particular, this advantage is made more remarkable by the features that the contrast emphasis processor 31 performs contrast emphasis processing on data of a pixel located at each position (set of coordinates) in a combined luminance image using a contrast component emphasis amount which varies depending on the position and the chroma emphasis processor 32 performs chroma emphasis processing on data of a pixel, located at the same position (coordinates) as the above pixel in the combined luminance image, in each combined color difference image using a contrast component emphasis amount which varies in link with the contrast component emphasis amount for the above pixel in the combined luminance image.

This advantage is clearly seen from FIGS. 7A-7D and FIG. 8. FIGS. 7A-7D show example image data that were generated in executing the image alteration process of FIG. 3, and correspond to the example image data of FIG. 4E.

Figure 7A:
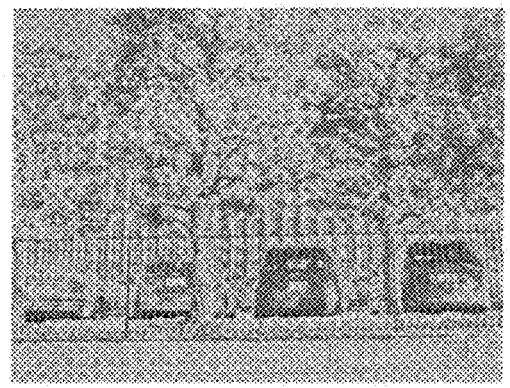
FIGS. 7A-7D are example image data generated in executing the image alteration process of FIG. 3.

FIG. 7A shows example combined image data that was generated by step S2.

Figure 7B:
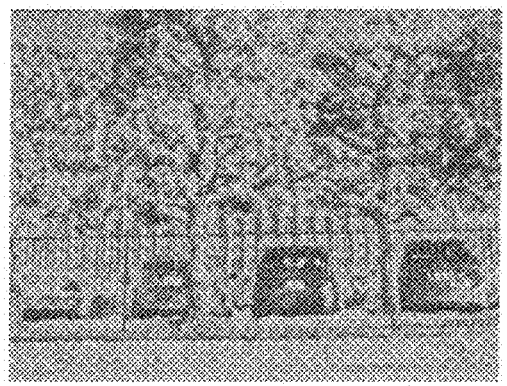

FIG. 7B shows example filtered data of the entire image that was generated by applying an ε filter (size: 33×33 pixels) for medium-frequency band contrast emphasis to the entire combined image data of FIG. 7A at step S23 shown in FIG. 5 of the image alteration process of FIG. 3.

Figure 7C:

FIG. 7C shows example filtered data of the entire image that was generated by applying an ε filter (size: 129×129 pixels) for low-frequency band contrast emphasis to the entire combined image data of FIG. 7A at step S23 shown in FIG. 5 of the image alteration process of FIG. 3.

Figure 7D:
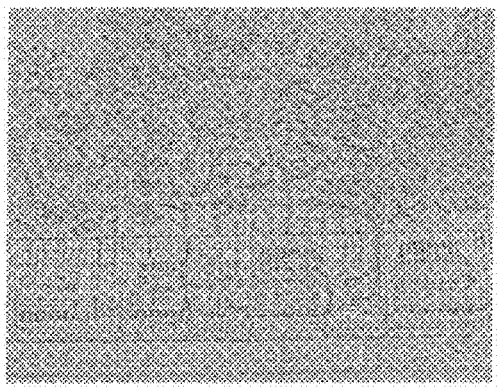

FIG. 7D shows an example contrast component of the entire image that was generated using the data of FIGS. 7A-7C at steps S24 and S25 shown in FIG. 5 of the image alteration process of FIG. 3.

Figure 8:
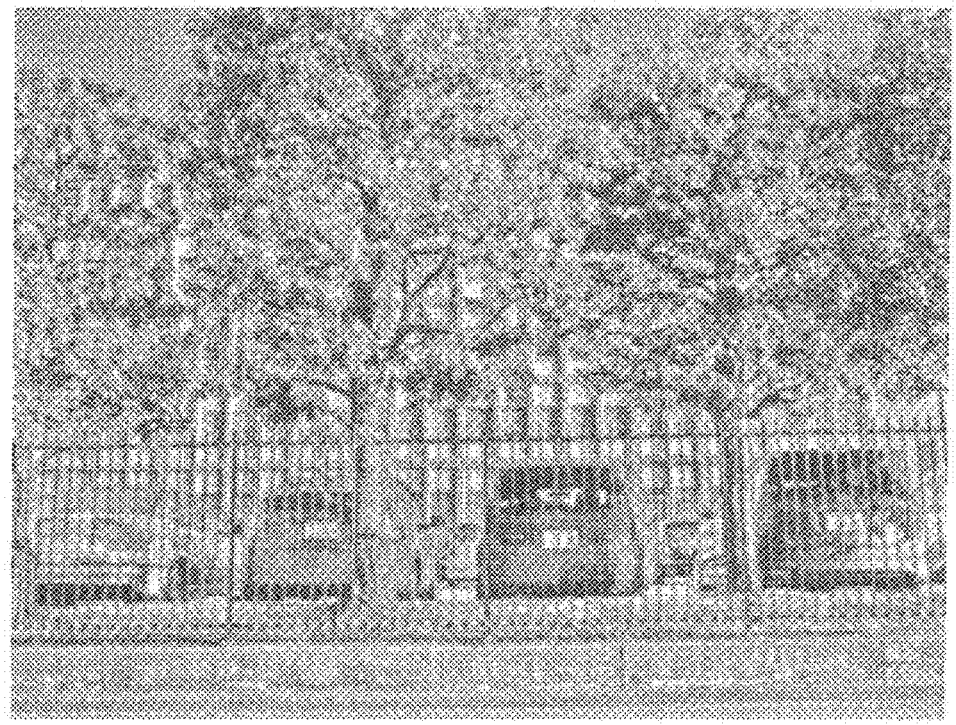
FIG. 8 shows example contrast-emphasized image data generated by the image alteration process of FIG. 3 using the data of FIGS. 7A-7D.

FIG. 8 shows example contrast-emphasized image data that was generated by the image alteration process of FIG. 3 using the data of FIGS. 7A-7D. It is seen that this contrast-emphasized image is such that color space parameters are adjusted excessively but reality is not lost.

The invention is not limited to the above embodiment but encompasses modifications, improvements, etc. made in such a range that the object of the invention can be attained.

For example, in the above embodiment, the ε filters are used as smoothing filters in the contrast emphasis process which is executed by the contrast emphasis processor 31. However, as mentioned above, the filter used for that purpose is not limited to an ε filter. For example, an ordinary LPF may be employed when it is desired to generate an image which includes an intentional undershoot or an overshoot which is generated in making local contrast emphasis.

Although the above embodiment employs two frequency bands (a low-frequency band and a high-frequency band) in the contrast emphasis process, the invention is not limited to such a case and may employ three or more frequency bands. For example, a high-frequency band may be employed in addition to the low-frequency and high-frequency bands, in which case sharpness can be increased by emphasizing high-frequency components.

In the above embodiment, no consideration is given to a case that a processing subject image of partial chroma emphasis processing includes a face image region. However, it is possible to detect a face image region using a known face image region detecting technique and perform partial chroma emphasis processing with small emphasis amounts taking the detected face image region into consideration. This processing can solve a problem that a skin-color hue texture or the like of a face are lost due to excessive chroma emphasis.

More specifically, a contrast component emphasis amount and a chroma component emphasis amount to be applied to luminance image data and color difference image data, respectively, of a face image region when it is detected are set in advance. These emphasis amounts may be smaller than (about 80% of) contrast component emphasis amounts and chroma component emphasis amounts described above, respectively.

If a face image region is detected, an image generated through partial emphasis processing with contrast component emphasis amounts and chroma component emphasis amounts and an image generated through partial emphasis processing with the contrast component emphasis amount and the chroma component emphasis amount for a face image region are generated at the above-described step S3 and S4. A combined image is obtained by α-blending these images on a pixel-by-pixel basis (α-blending: blending with transparency adjustment).

The α-blending may be performed in such a manner that the proportion of the image generated through the partial emphasis processing with the contrast component emphasis amount and the chroma component emphasis amount for a face image region is set higher in the detected face image region and its vicinity and the proportion of the image generated at steps S3 and S4 through the partial emphasis processing with the contrast component emphasis amounts and the chroma component emphasis amounts is set higher in the other region.

In the above embodiment, three image data having different exposure values are combined together by pixel-by-pixel addition combining, the number of image data to be combined together is not limited to three. That is, the invention can broadly applied to a case that an arbitrary number of (two or more) image data are subjected to pixel-by-pixel addition combining.

Various image data as subjects of the image alteration process are not limited to example image data described in the above embodiment. For example, exposure values that are set in generating plural image data to be combined together are not limited to example values described in the embodiment and may be arbitrary values as long as they are different from each other.

Although not described in the above embodiment, it is advantageous that positional deviations between plural image data having different exposure values be corrected in advance because they will be subjected to pixel-by-pixel addition combining.

Although the image processing according to the embodiment is a digital camera, the invention is not limited to such a case but applied to general electronic devices having an image processing function. Thus, the invention can broadly be applied to digital photo frames, personal computers, portable navigation system, portable game machines, etc.

Figure 9:
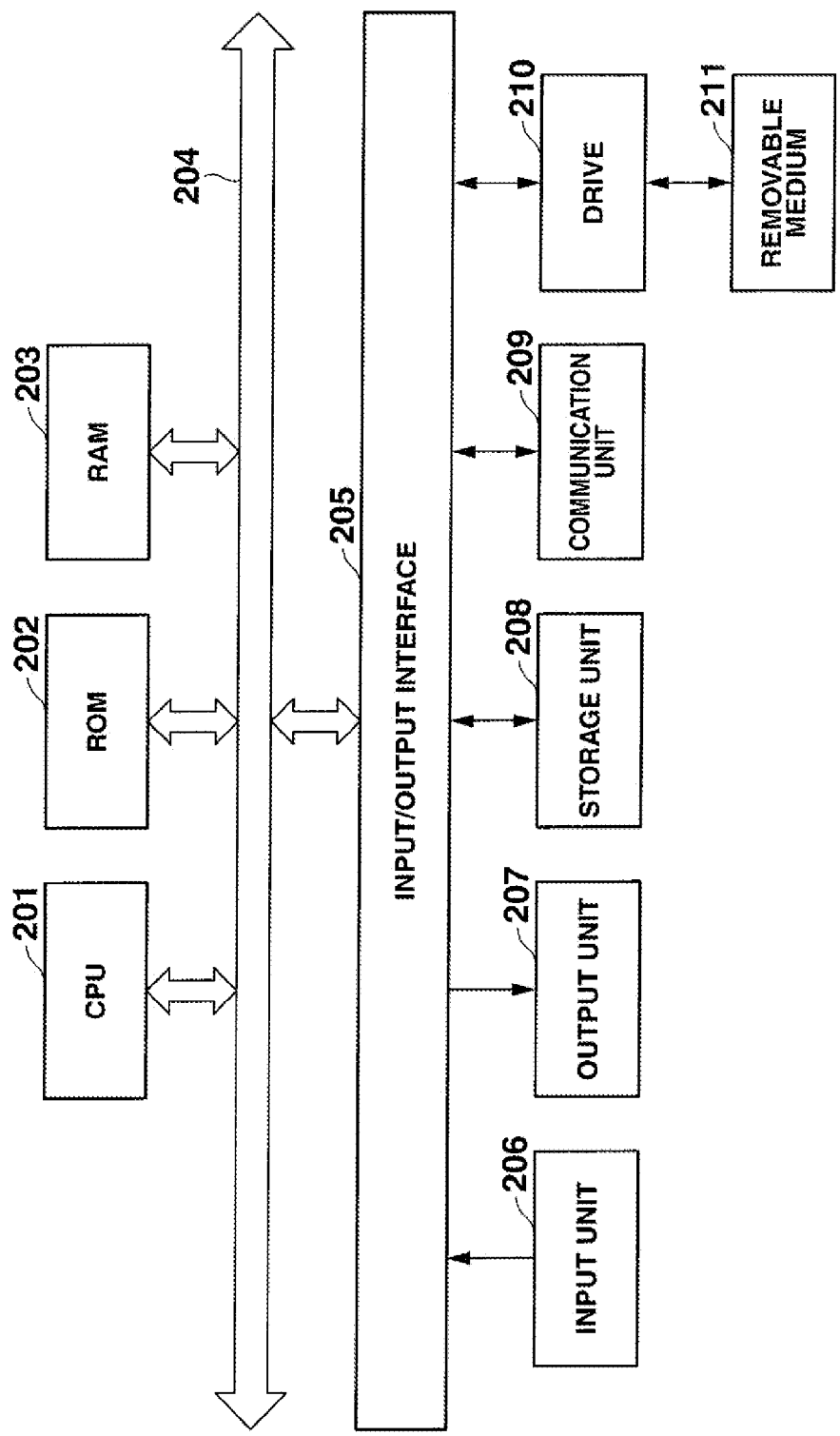
FIG. 9 is a block diagram showing the hardware configuration of an image processor according to another embodiment of the invention.

The above-described processes can be executed by either hardware or software. FIG. 9 is a block diagram showing the hardware configuration of an image processor according to another embodiment of the invention in which the above-described processes are executed by software.

The image processor of FIG. 9 includes a CPU (central processing unit) 201, a ROM (read-only memory) 202, a RAM (random access memory) 203, a bus 204, an input/output interface 205, an input unit 206, an output unit 207, a storage unit 208, a communication unit 209, and a drive 210.

The CPU 201 executes various processes according to programs recorded in the ROM 202. Or the CPU 201 executes various processes according to programs that have been loaded into the RAM 203 from the storage unit 208.

Data that are necessary when the CPU 201 executes various processes are also stored in the RAM 203 as appropriate.

For example, in this embodiment, programs for realizing the combiner 11, the image generator 12, and the noise reduction unit 13 are stored in the ROM 202 or the storage unit 208. Therefore, the functions of the combiner 11, the image generator 12, and the noise reduction unit 13 can be realized when the CPU 201 runs those programs.

The CPU 201, the ROM 202, and the RAM 203 are connected to each other by the bus 204. The bus 204 is also connected to the input/output interface 205. The input unit 206, the output unit 207, the storage unit 208, and the communication unit 209 are connected to the input/output interface 205.

The input unit 206 is a unit having various buttons etc., and receives user instructions and various kinds of information.

The output unit 207 outputs various kinds of information. For example, the output unit 207 includes a display unit (not shown) and displays a composed image that is represented by output data of the combiner 11.

The storage unit 208 is a hard disk drive, a DRAM (dynamic random access memory), or the like, and stores various kinds of data.

The communication unit 209 controls a communication that is performed with another apparatus (not shown) over a network such as the Internet.

When necessary, the drive 210 is also connected to the input/output interface 205 and a removable medium 211 such as a magnetic disk, an optical disc, a magneto-optical disc, or a semiconductor memory is inserted into it. A program that is read from the removable medium 211 by the drive 210 is installed in the storage unit 208 if necessary. Like the storage unit 208, the removable medium 211 can store various data such as image data.

To execute a certain process by software, a program as the software is installed in a computer or the like from a network or a recording medium. The computer may be incorporated in dedicated hardware. Alternatively, the computer may be a computer such as a general-purpose personal computer which can perform various functions when various programs are installed therein.

A recording medium containing such a program is the removable medium 211 that is distributed separately from the device main body to provide the user with the program, a recording medium that is provided to the user in such a state as to be incorporated in the device main body, or a like recording medium. The removable medium 211 is a magnetic disk (including a floppy disk), an optical disc, a magneto-optical disc, or the like. Example optical discs are a CD-ROM (compact disc-read only memory) are a DVD (digital versatile disc). An example magneto-optical disc is an MD (mini disc). An example recording medium that is provided to the user in such a state as to be incorporated in the device main body is the ROM 202 which is stored with programs and the hard disk drive of the storage unit 208.

Steps of a program recorded in a recording medium that are described in this specification may naturally be executed in the time-series order as described. However, they need not always be executed in time-series order, that is, they may be executed parallel or individually.

What is claimed is:

1. An image processor comprising:
    a first emphasis processor configured to emphasize a contrast of first image data in accordance with a first emphasis amount that is adjusted for each of positions of the first image data, when combined image data obtained by combining a plurality of image data having different exposure values is separated into the first image data having a luminance component defined in a prescribed color space and second image data having at least a chroma component;
    a total emphasis processor configured to emphasize a chroma of the second image data totally in accordance with a second emphasis amount; and
    a second emphasis processor configured to further emphasize the chroma of the second image data whose chroma is emphasized by the total emphasis processor, in accordance with a third emphasis amount that is adjusted for each of positions of the second image data and depending on variation of the first emphasis amount.

2. The image processor according to claim 1, further comprising:
    an image region detector configured to detect a face image region from at least one of the plurality of image data having different exposure values,
    wherein if the image region detector detects the face image region, the first emphasis processor emphasizes the contrast of the first image data in accordance with a fourth emphasis amount that is smaller than the first emphasis amount, and the second emphasis processor emphasizes the chroma of the second image data in accordance with a fifth emphasis amount that is varied depending on variation of the fourth emphasis amount.

3. The image processor according to claim 2, wherein the first emphasis processor emphasizes the contrast of a region around the face image region in the first image data.

4. The image processor according to claim 2, wherein the second emphasis processor emphasizes the chroma of a region around the face image region in the second image data.

5. A non-transitory computer-readable medium storing a program for causing a computer for controlling an image processor performing image processing on image data to function as elements comprising:
    a first emphasis processor configured to emphasize a contrast of first image data in accordance with a first emphasis amount that is adjusted for each of positions of the first image data, when combined image data obtained by combining a plurality of image data having different exposure values is separated into the first image data having a luminance component defined in a prescribed color space and second image data having at least a chroma component;
    a total emphasis processor configured to emphasize a chroma of the second image data totally in accordance with a second emphasis amount; and
    a second emphasis processor configured to further emphasize the chroma of the second image data whose chroma is emphasized by the total emphasis processor, in accordance with a third emphasis amount that is adjusted for each of positions of the second image data and depending on variation of the first emphasis amount.

* * * * *